(12) United States Patent
Thorwarth

(10) Patent No.: US 11,203,090 B2
(45) Date of Patent: Dec. 21, 2021

(54) MANUFACTURING STATION AND MANUFACTURING PROCESS

(71) Applicant: KUKA SYSTEMS GmbH, Augsburg (DE)

(72) Inventor: Paul Thorwarth, Augsburg (DE)

(73) Assignee: KUKA SYSTEMS GmbH, Augsburg (DE)

( * ) Notice: Subject to any disclaimer, the term of this patent is extended or adjusted under 35 U.S.C. 154(b) by 0 days.

(21) Appl. No.: 16/495,664

(22) PCT Filed: Mar. 20, 2018

(86) PCT No.: PCT/EP2018/056988
§ 371 (c)(1),
(2) Date: Sep. 19, 2019

(87) PCT Pub. No.: WO2018/172336
PCT Pub. Date: Sep. 27, 2018

(65) Prior Publication Data
US 2020/0016706 A1 Jan. 16, 2020

(30) Foreign Application Priority Data

Mar. 21, 2017 (DE) ...................... 20 2017 101 643.9

(51) Int. Cl.
*B23P 21/00* (2006.01)
*B23P 23/06* (2006.01)
(Continued)

(52) U.S. Cl.
CPC ............. *B23P 21/004* (2013.01); *B23P 23/06* (2013.01); *B23P 21/00* (2013.01);
(Continued)

(58) Field of Classification Search
CPC ......... B23P 21/004; B23P 23/06; B23P 21/00; B23P 2700/50; Y10T 29/49829;
(Continued)

(56) References Cited

U.S. PATENT DOCUMENTS 4,722,653 A * 2/1988 Williams ................ B23P 21/00
198/346.1
4,894,908 A * 1/1990 Haba, Jr. ............... B23P 21/004
29/711

(Continued)

FOREIGN PATENT DOCUMENTS

DE 102008009995 A1 8/2009
DE 202008012602 U1 3/2010
(Continued)

*Primary Examiner* — Sarang Afzali
*Assistant Examiner* — Darrell C Ford
(74) *Attorney, Agent, or Firm* — McGlew and Tuttle, P.C.

(57) ABSTRACT

An automatic manufacturing station (3) and a manufacturing process for workpieces (2), in particular for vehicle body parts, has a manufacturing area (4) with a plurality of program-controlled manufacturing robots (9). The workpieces (2) are externally fed to the manufacturing station (3)
(Continued)

on production load carriers (8). The manufacturing station (3) also has a plurality of work stations (10, 11, 12, 13). A station-bound transport device (15) transports the production load carriers (8) within the manufacturing station (3).

17 Claims, 2 Drawing Sheets

(51) Int. Cl.
*B25J 9/00* (2006.01)
*B62D 65/02* (2006.01)
*B62D 65/18* (2006.01)

(52) U.S. Cl.
CPC ......... *B23P 2700/50* (2013.01); *B25J 9/0084* (2013.01); *B62D 65/022* (2013.01); *B62D 65/18* (2013.01); *Y10T 29/49826* (2015.01); *Y10T 29/49828* (2015.01); *Y10T 29/49829* (2015.01); *Y10T 29/49831* (2015.01); *Y10T 29/5196* (2015.01); *Y10T 29/534* (2015.01); *Y10T 29/53187* (2015.01); *Y10T 29/53413* (2015.01)

(58) Field of Classification Search
CPC ......... Y10T 29/49828; Y10T 29/49826; Y10T 29/53413; Y10T 29/534; Y10T 29/49831; Y10T 29/5196; Y10T 29/53187; B25J 9/0084; B62D 65/022; B62D 65/18
USPC ........ 29/429, 430, 431, 33 P, 783, 791, 794, 29/428
See application file for complete search history.

(56) References Cited

U.S. PATENT DOCUMENTS

| | | | | |
|---|---|---|---|---|
| 5,111,988 | A * | 5/1992 | Strickland | B23K 37/047 228/102 |
| 5,353,495 | A * | 10/1994 | Terabayashi | B23Q 7/1442 29/714 |
| 5,737,827 | A * | 4/1998 | Kuse | B23P 19/001 29/701 |
| 6,089,811 | A * | 7/2000 | Watanabe | B23Q 41/02 414/269 |
| 7,490,710 | B1 * | 2/2009 | Weskamp | B23Q 7/1426 198/345.3 |
| 9,351,569 | B1 * | 5/2016 | Lucey | B23P 21/002 |
| 10,981,270 | B1 * | 4/2021 | Pastor Sampedro | B25J 9/163 |
| 2005/0060862 | A1 * | 3/2005 | Baulier | B23K 37/04 29/429 |
| 2009/0249606 | A1 * | 10/2009 | Diez | B23K 37/0461 29/428 |
| 2014/0147240 | A1 * | 5/2014 | Noda | B25J 19/021 414/751.1 |
| 2014/0283357 | A1 * | 9/2014 | Harada | B23P 21/004 29/430 |
| 2015/0240744 | A1 * | 8/2015 | Marrocco | F01L 3/10 29/888.06 |
| 2020/0016706 | A1 * | 1/2020 | Thorwarth | B23P 21/004 |
| 2020/0324378 | A1 * | 10/2020 | Thorwarth | B23P 21/004 |
| 2021/0154950 | A1 * | 5/2021 | Czinger | B25J 9/1682 |
| 2021/0162583 | A1 * | 6/2021 | Buvat | B25J 9/0084 |

FOREIGN PATENT DOCUMENTS

| | | |
|---|---|---|
| WO | 2015132378 A1 | 9/2015 |
| WO | 2016131961 A1 | 8/2016 |

* cited by examiner

MANUFACTURING STATION AND MANUFACTURING PROCESS

CROSS REFERENCE TO RELATED APPLICATIONS

This application is a United States National Phase Application of International Application PCT/EP2018/056988, filed Mar. 20, 2018, and claims the benefit of priority under 35 U.S.C. § 119 of German Application 20 2017 101 643.9, filed Mar. 21, 2017, the entire contents of which are incorporated herein by reference.

TECHNICAL FIELD

The present invention pertains to a manufacturing station for workpieces, especially for vehicle body parts, which has a manufacturing area with a work station and with a plurality of program-controlled manufacturing robots, wherein the workpieces are fed to the manufacturing station on production load carriers from the outside and to a manufacturing process, especially for vehicle body parts, by means of an automated manufacturing station, which has a manufacturing area with a work station and with a plurality of program-controlled manufacturing robots, wherein the workpieces are fed to the manufacturing station on production load carriers from the outside.

TECHNICAL BACKGROUND

Such an automatic manufacturing station is known from WO 2016/131961 A1. It has a manufacturing area with a work station and with a plurality of program-controlled manufacturing robots. The workpieces are fed to the manufacturing station from the outside on a workpiece holder. This is arranged detachably on an autonomous conveying vehicle and is moved by this into the manufacturing station and positioned at the work station. The processing of the workpieces takes place on the workpiece holder.

Further, robot gardens with a plurality of work stations and with work processes comprising a plurality of cycles are known from practice, in which workpieces are processed and handled by manufacturing robots and are transported between the work stations.

SUMMARY

An object of the present invention is to show an improved manufacturing engineering.

This object is accomplished by the present invention. The manufacturing engineering of the invention, the manufacturing station, the manufacturing process and a manufacturing plant, have various advantages.

The manufacturing engineering of the invention makes it possible to uncouple manufacturing stations and work processes taking place there as well as work cycles from a conveying device in the manufacturing plant, which connects the manufacturing stations to one another and to a logistics area. Waiting times at manufacturing stations as well as excess capacities in terms of conveying means can be avoided at the conveying device. The flow of workpieces and the production flow within a manufacturing plant can be improved and speeded up.

The automatic manufacturing station has a plurality of work stations and a station-bound transport means for transporting the production load carriers within the manufacturing station. The production load carriers may be transferred from the external conveying device onto the transport means at or in front of the manufacturing station. The production load carriers may be transported next to and along the work stations within the manufacturing area, which is preferably configured as a robot garden. The production load carriers may be moved along in the manufacturing area with a work or production process, which preferably comprises a plurality of cycles, and they are available for the work processes at at least some work stations.

The workpiece may be configured as a one-part or multipart workpiece, preferably as a set of vehicle body parts. The workpiece may be removed from the production load carrier by means of a manufacturing robot completely or partially during the work process, which preferably has a plurality of cycles, processed at the work stations and handled as well as transported further between the work stations. Any additional parts of the workpiece that may be needed may be available on the production load carrier and fed as needed by a manufacturing robot to the corresponding work station and to the work process taking place there. The work processes may be of any desired type and there may be any desired number of work processes involved.

At the end, the processed workpiece is placed again on the production load carrier, which is then unloaded with the workpiece from the transport means and can be transported further via the external conveying device or in another manner, e.g., via a deposit site.

The transport means is arranged next to the work stations and is preferably configured as a sequential transport means. The transport means may pick up a plurality of production load carriers, especially in a row one after another. It has a plurality of pick-up locations for a respective production load carrier. The number of pick-up locations is equal to or greater than the number of work stations and/or equal to or greater than the number of work cycles in the manufacturing station.

The transport means is preferably configured as a linear conveyor. It may be a continuous conveyor or an intermittent conveyor. The transport means has a transport cycle adapted to the work cycles or a correspondingly adapted continuous transport speed. It is located with its work stations in the work area of manufacturing robots, which can remove a part of the workpiece and feed it to the work station, which is likewise located in their work area, and to the workpiece mount located there.

A storage unit for loaded and/or empty production load carriers in the manufacturing station has various advantages. On the one hand, defective workpieces can already be removed from the production flow within the manufacturing station and brought into the storage unit. The storage unit may also be used for the purpose of buffering if the production flow running over a plurality of manufacturing stations is stopped or interrupted in the manufacturing plant. In addition, the external conveying device can be relieved and optimized. The work or production process can continue unhindered within the manufacturing station due to the possibility of storage.

A loading device may be used to load and unload the external conveying device or to deposit and pick up production load carriers at a deposit site, which may be located between adjacent manufacturing stations. The loading device may also operate the storage unit.

The production load carriers may be flexible and also multifunctional. They can be adapted, on the one hand, to a plurality of workpieces of different types. As a result, they can pick up, for example, parts sets of different vehicle or body models. This makes possible a flexible production in terms of models in a free mix in the manufacturing station and in the manufacturing plant. In addition, the production load carriers may pick up and transport, as needed, devices or other components needed in a manufacturing station. As a result, a manufacturing station can be retooled as needed and in a short time.

The production load carriers may have a stack-like configuration. They may have spacers, which make stacking possible together with a picked-up workpiece. The capacity of the storage unit can be increased by the possibility of stacking with a low space requirement.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
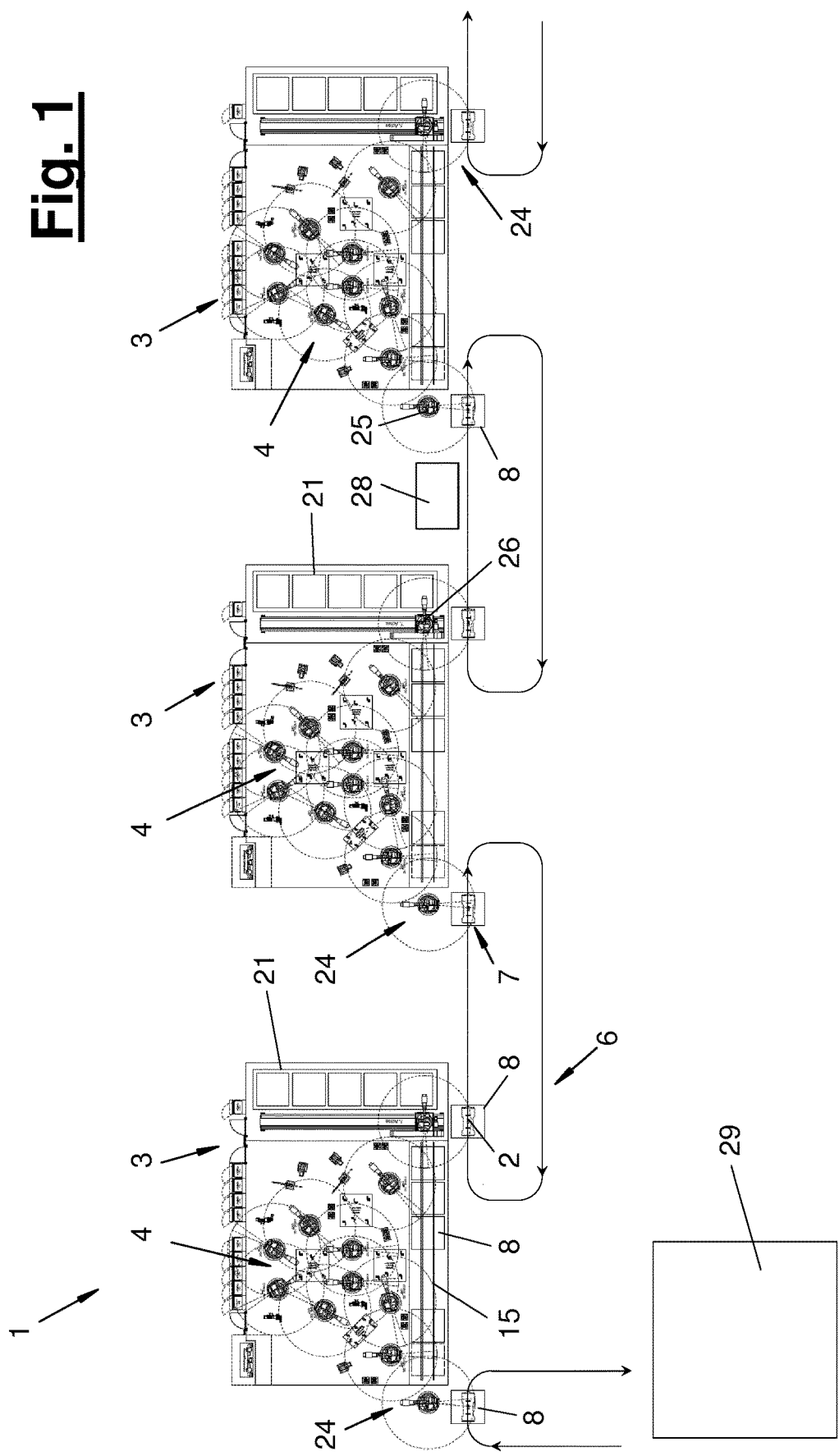
FIG. 1 is a schematic view showing a manufacturing plant with a plurality of manufacturing stations, with a logistics area and with a conveying device.

Referring to the drawings, the present invention pertains to a manufacturing station as well as to a manufacturing process for workpieces (2). The present invention further pertains to a manufacturing plant (1) with a plurality of manufacturing stations and with a manufacturing sequence.

In a schematic detail view, FIG. 1 shows an automatic manufacturing plant (1), which contains a plurality of automatic manufacturing stations (3). The manufacturing plant (1) may further have a conveying device (6), which connects all or at least some manufacturing stations (3) to one another. The manufacturing plant (1) may further have a logistics area (29), which may likewise be connected to the conveying device (6).

The workpieces (2) may be of any type and configuration. They are preferably vehicle body parts, especially sheet metal parts consisting of metal. A workpiece (2) may be a one-part or multipart workpiece. It is preferably a multipart workpiece and is configured as a parts set.

Any desired work process may be carried out on the workpieces (2) in the manufacturing plant (1) and in the manufacturing stations (3). These are preferably assembly and joining processes. Joined parts groups are formed from individual vehicle body parts, and these groups are then complemented with parts and joined to form larger vehicle body components.

The workpieces (2) are located on production load carriers (8), which will hereinafter be called PLCs for short. The PLCs (8) are configured, for example, as frame- or shell-like racks or pallets and pick up the one-part or multipart workpiece (2) in a positioned state. Corresponding workpiece holders, optionally with clamping function, are present for this purpose. The PLCs (8) have a readable, individual marking. They are identifiable for the controls of the manufacturing plant (1) and of the manufacturing stations (3). Further, there is an assignment to the likewise individualized workpieces (2) and the PLC (8) thereof.

The conveying device (6) may have any desired and suitable configuration. In the preferred embodiment shown, it comprises a fleet of autonomous and individually controllable conveying means (7). These may be, e.g., floor-mounted automatic, self-steering and driverless transport vehicles. The conveying means (7) may detachably pick up and transport one or more PLCs (8) each in a predefined position. The conveying means (7) may be configured as an individual vehicle or as a group of vehicles, e.g., as an autonomous tractor vehicle with one or more trailers. The conveying means (7) are dispatched by a fleet manager. They transport the PLCs (8) to and from the manufacturing stations (3).

FIG. 1 shows a row of manufacturing stations (3) linked to one another in terms of production and material handling. The interlinking in terms of material handling may be embodied by means of the conveying device (6) and one or more loops thereof, which are shown as an example. As an alternative or in addition, PLCs (8) may be conveyed between adjacent manufacturing stations (3) via a deposit site arranged between them.

Figure 2:
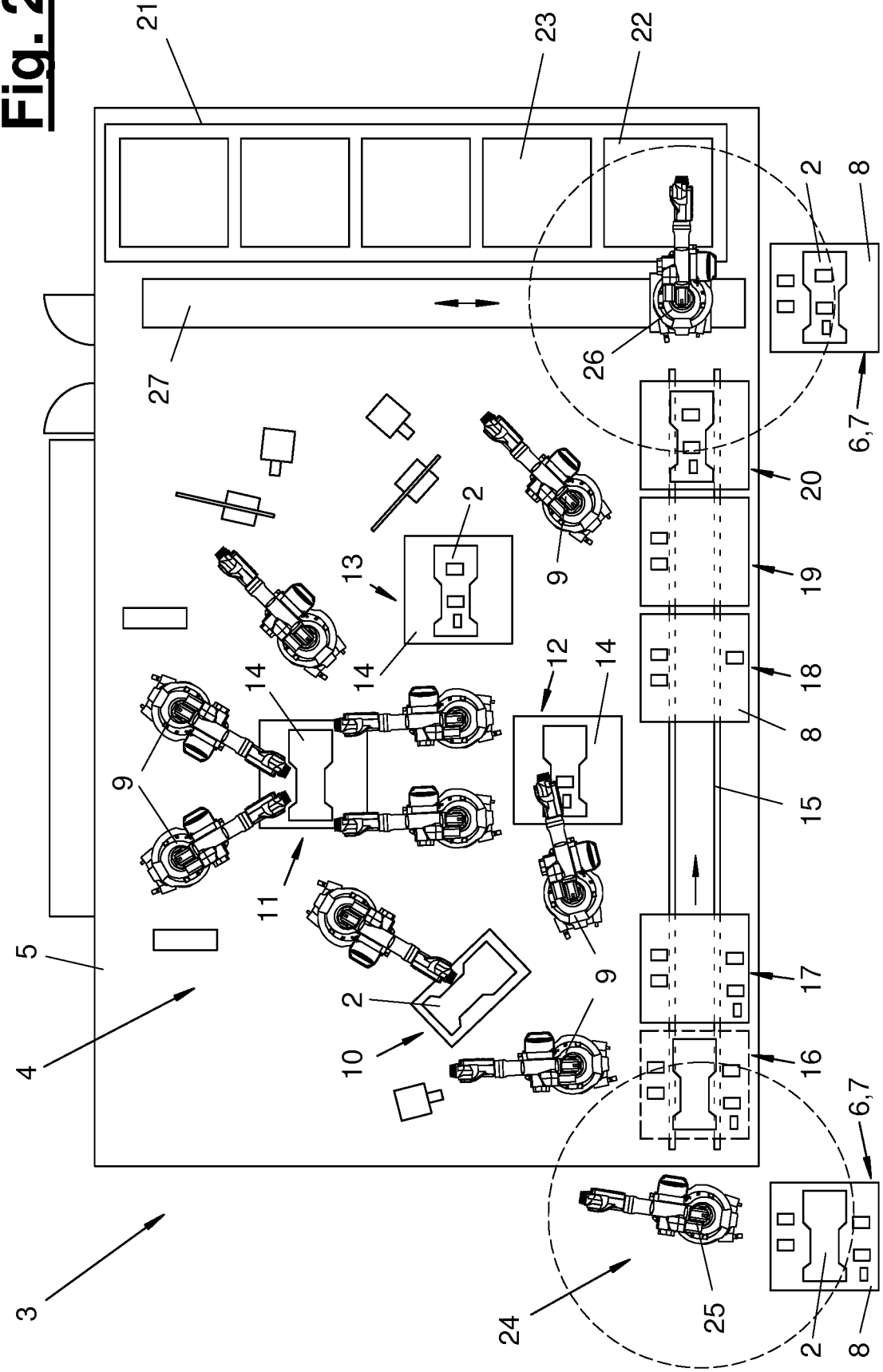
FIG. 2 is a schematic view of a manufacturing station.

FIG. 2 schematically shows a manufacturing station (3), which may be present in the manufacturing plant (1) as a plurality of manufacturing stations having the same or similar configuration. The manufacturing station (3) has a manufacturing area (4) with a plurality of work stations (10, 11, 12, 13) and with a plurality of program-controlled manufacturing robots (9). A station-bound transport means (15) for transporting the PLCs (8) within the manufacturing station (3) is also located in the manufacturing area (4). Further, a storage unit (21) may be arranged in the manufacturing area (4). The manufacturing area (4) with the above-mentioned components may be formed on the outer side by a protective partition (5), e.g., a protective fence with a plurality of controllable and monitored entrances. A loading device (24) may be associated with the manufacturing station (3).

The manufacturing area (4) is configured, e.g., as a robot garden, with a workpiece mount (14) each being arranged at the work stations (10, 11, 12, 13) distributed locally in the manufacturing area (4). The manufacturing robots (9) are configured as programmable industrial robots with a plurality of rotatory and/or translatory axes. They carry a possibly replaceable tool.

One or more manufacturing robots (9) are configured and programmed to load a workpiece in the manufacturing area (4) from and onto a production load carrier (8). One or more manufacturing robots (9) may further be configured and programmed to transport a workpiece (2) between the work stations (10, 11, 12, 13). They can pick up a workpiece (2) from a workpiece mount (14) with a gripping tool and deposit it at a workpiece mount (14) of another work station.

A work process, which comprises a plurality of working steps and a plurality of work cycles, is carried out on the workpiece (2) in the manufacturing station (3) and in the manufacturing area (4).

The station-bound transport means (15) is present as one transport means or as a plurality of transport means. It is arranged next to the work stations (10, 11, 12, 13). It also extends along the work stations (10, 11, 12, 13). The transport means (15) may be located at the edge of the manufacturing area (4) or at another location.

The transport means (15) is preferably arranged in a floor-mounted manner. It is used to pick up and transport a plurality of PLCs (8), preferably in a closed row one after another. The transport means (15) has a plurality of pick-up locations (16-20) for a PLC (8) each. Only some of the PLCs (8) are shown on the transport means (15) in the drawings for the sake of clarity.

The transport means (15) preferably has a finite transport or conveying path. It conveys the picked-up PLCs (8) in a predefined direction. The transport means (15) is configured in the embodiments shown as a one-part conveyor that is continuous over the length of the conveying path. As an alternative, a transport means (15) may be segmented into a plurality of conveying sections.

The transport means (15) is configured in the embodiment shown as a linear conveyor extending in a straight line. The transport means (15), especially the linear conveyor, may be configured, e.g., as a belt conveyor or roller table, skid conveyor, lifting shuttle or in another suitable manner.

In another embodiment variant, the transport means (15) may extend in a curved shape in at least some areas. It may also have an endless conveyor track or a conveyor track closed in a ring-shaped manner.

The transport means (15) may be a continuously or intermittently conveying transport means. It may have a transport cycle adapted to the work cycles in the manufacturing area (4) or a continuous transport speed. As a result, the progression of the conveying of the PLCs (8) can be adapted to the progression of the production or work. The number of pick-up locations (16-20) of the transport means (15) is preferably equal to or greater than the number of work stations (10, 11, 12, 13) and equal to or greater than the number of work cycles in the manufacturing area (4).

The transport means (15) is located with its pick-up locations (16-20) in the work area of at least some of the manufacturing robots (9). Due to the coordinated transport progression or feed, the PLCs (8) can be moved synchronously with the progression of the production or work being performed on the associated and previously unloaded parts of the workpiece (2).

Other parts of the workpiece (2) may also be located on the PLCs (8). They are available at the work stations (10, 11, 12, 13) as needed. A manufacturing robot (9) at a work station (10, 11, 12, 13) can remove a workpiece part from the PLC (8) and feed it to the work station (10, 11, 12, 13) and to the work process being carried out there. It may also return workpiece parts from the work process onto a PLC (8) as needed. The flow of workpieces and parts between the work stations (10, 11, 12, 13) may partially also take place via the transport means (15).

In the embodiments shown, a PLC (8) loaded with a workpiece (2) is fed to the transport means (15) by a loading device (24) and is deposited at the first pick-up location (16). A manufacturing robot (9) then removes from this PLC (8) the workpiece (2) or parts thereof and brings it or them to the first work station (10). The PLC (8) can be unloaded now completely or partially in the above-mentioned manner. A partial unloading, in which case workpiece parts remain on the PLC (8), is shown in FIG. 2.

After the end of the first working step or work cycle at the work station (10), the workpiece (2) is conveyed further to the next work station (11) and is positioned there again at a workpiece mount (14) as well as subjected to further processing. The PLC (8) may remain at the pick-up location (16) during the first work cycle or be slowly conveyed further, and it is still in the work area of the manufacturing robot (9), if necessary, and it makes it possible to unload additional workpiece parts and to feed them to the work station (10).

The PLC (8) is also correspondingly conveyed further in the row of the pick-up locations (16-20) with the further conveying of the workpiece (2) or of parts thereof between the work stations (10, 11, 12, 13). A PLC (8) at the pick-up location (18) is available, e.g., for a work process at the work station (12) and for the workstation (13) at the pick-up location (19).

At the end of the work or production process and at the end of the transport means (15), the workpiece (2) is loaded from the last work station (13) back onto the PLC (8) at the possibly last pick-up location (20) by a manufacturing robot (9).

The loading device (24) is preferably associated with the manufacturing station (3). The loading device (24) may contain one or more, e.g., two loading robots (25, 26). The loading robots (25, 26) are arranged, e.g., each at one end of the transport means (15). They may be arranged within or outside the manufacturing area (4) and the manufacturing station (3).

The inlet-side loading robot (25) is arranged, e.g., outside and at an end of the manufacturing station (3). It unloads PLCs (8) loaded with a workpiece (2) from a conveying means (7) and places them on the first pick-up location (16). The outlet-side loading robot (26) is arranged within the manufacturing station (3) and at the end of the transport means (15). It removes the PLC (8) that is loaded again with a workpiece (2) from the last pick-up location (20) and loads it onto an already stopped, identical or different conveying means (7). In the variant according to FIG. 1, the loading robot (26) may also deposit the loaded PLC (8) onto a deposit site (28) between adjacent manufacturing stations (3).

The manufacturing station (3) may have according to FIG. 2 a storage unit (21) with one or more storage spaces (22, 23), especially in an arrangement in a row, for one or more empty PLCs (8) or PLCs loaded with a workpiece (2). The storage unit may be used as a buffer for PLCS (8) containing workpieces of good quality. It may also pick up PLCs (8) containing workpieces (2) that are not acceptable and were sorted out during a quality control. The storage unit (21) may be arranged in the vicinity of the transport means (15), especially at the outlet-side end area thereof. It may be oriented at right angles to the transport means (15).

The storage unit (21) may be arranged within the protective partition (5). It may be configured as a shelf storage unit, a rotary storage unit or in any other manner. The storage unit (21) may be located at an edge of the manufacturing area (4). It may be configured and arranged as a self-contained unit. As an alternative or in addition, it may be integrated in the transport means (15).

The storage unit (21) is operated by a material handling device. It may be filled and emptied as well as rearranged as needed. This material handling device may be configured and arranged as a self-contained unit. It may also be, for example, the loading robot (26). This is arranged, e.g., to increase its working range, on an auxiliary axis (27). This may be, e.g., a straight travel axis, which extends along the row of storage spaces (22, 23).

The PLCs (8) may have a stack-like configuration. For example, empty PLCs (8) may be placed one on another in a stack. It is possible, in addition, that PLCs (8) with a picked-up workpiece (2) are stacked one on top of another. The PLCs (8) may have for this purpose upright spacers, which are arranged, e.g., at the corner areas and at the top side of the PLCs (8). The spacers, which are, e.g., rod-shaped, may interact with adapted mounts on the underside of the PLCs (8) for a stable and positive-locking stack formation. If stackable PLCs (8) are used, the storage unit (21) may be simplified, and the storage spaces (22, 23) may be configured as reserved bottom surfaces. The PLCs (8) may be handled by said material handling device, a manufacturing robot (9) or a loading robot (25, 26) when stacking and unstacking.

The logistics area (29) mentioned in the introduction may have different functions and configurations. On the one hand, it may have a supply of PLCs (8) and conveying means (7) as well as of workpieces (2) and optionally of tools. Further, a commissioning may be present for putting together workpieces (2) and a loading device for loading PLCs (8) with workpieces (2). The PLCs (8) can be loaded and unloaded from the conveying means (7) by means of another loading device. In one variant, it is possible to load the provided and commissioned workpieces (2) on PLCs (8), which are already connected to a conveying means (7) and are transported by this. Further, tools may be loaded, if necessary, on a PLC (8) and made available to a work station (10, 11, 12, 13) as needed. They can be distributed in a manufacturing station (3) by means of the manufacturing robots (9) and the transport means (15).

A manufacturing station (3) may contain further components. These may be, e.g., devices that are arranged at the work stations (10, 11, 12, 13) and in the work area of the manufacturing robots (9) located there. Such devices may be, e.g., welding devices, application devices or the like. Further, a manufacturing station (3) may have said control, measuring and testing devices for quality assurance as well as supply devices for needed media, e.g., electrical energy, compressed air, hydraulic fluid, adhesives, powder or the like. In addition, additional feeding devices for components and workpiece parts may be connected to a manufacturing station (3).

Various variants of the embodiments shown and described are possible. In particular, the features of the different exemplary embodiments and of the variants mentioned may be combined with one another and especially also transposed as desired.

The transport means (15) may be configured and may function differently. In case of a complete unloading of a workpiece (2), it is possible, e.g., to combine the unloading site and the loading site. The transport means (15) may be configured as a tower-type storage unit, in which the unloaded and introduced PLCs (8) are rearranged in different layers in order to be ready again in time for loading with the workpiece (2) associated with them. This may take place according to the FiFo principle. A rotary table or another storage means may also be used instead of a tower-type storage unit. The number of pick-up or storage locations of the transport means (15) corresponds to the number of work stations (10, 11, 12, 13) or work cycles in this variant.

In a variant of the embodiment shown, the manufacturing area (4) may also have an optionally external work station for a working step or auxiliary process that is needed only occasionally. The embodiment shown is configured for a sequential work sequence in a manufacturing station (3), wherein only an individual conveying line or an individual conveying track is present. The transport means (15) may also be correspondingly adapted and have parallel conveying tracks or conveying sections for other types of production or work sequences that deviate from a strict sequence and contain parallel conveying sections.

In one embodiment variant, the loading device (24) or a loading robot may be associated with a conveying means (7). In another variant, a manufacturing robot (9) may assume the function of a loading robot (25, 26). A separate loading device (24) may now be dispensable.

While specific embodiments of the invention have been shown and described in detail to illustrate the application of the principles of the invention, it will be understood that the invention may be embodied otherwise without departing from such principles.

The invention claimed is:

1. An automated manufacturing station for workpieces, the manufacturing station comprising:
   a manufacturing area;
   a plurality of program-controlled manufacturing robots, wherein the manufacturing area is configured as a robot garden with the manufacturing robots distributed locally in the manufacturing area;
   production load carriers, which receive workpieces to form production load carriers carrying the workpieces, which carry the workpieces as a multipart workpiece comprising parts set in a positioned state, wherein the workpieces are fed to the manufacturing station on the production load carriers from outside the manufacturing station;
   a plurality of work stations, wherein a workpiece mount is at each of the work stations, which are distributed locally in the manufacturing area, and the manufacturing robots are associated with the workpiece mounts and configured to work on the workpieces in a region of the associated workpiece mounts;
   a station-bound transport means for transporting the production load carriers within the manufacturing station; and
   a loading device configured to at least one of load the production load carriers carrying the workpieces, from one or more external conveying device transporting production load carriers carrying the workpieces, onto the station-bound transport means and unload the production load carriers carrying the workpieces from the station-bound transport means to one or more external conveying device transporting production load carriers carrying the workpieces, wherein:
   one or more of the manufacturing robots is configured and programmed to load a workpiece, without the production load carriers, from one of the production load carriers carrying the workpieces on the station-bound transport means to one or more of the workpiece mounts of the work stations and to load workpieces, without the production load carriers, from the one or more of the workpiece mounts of the work stations onto one of the production load carriers on the station-bound transport means; and
   one or more of the manufacturing robots is configured and programmed to transport a workpiece between the work stations by picking up the workpiece, without the production load carriers, from the workpiece mount at one work station with a gripping tool and depositing the picked up workpiece, without the production load carriers, at the workpiece mount of another work station,
   whereby production load carriers carrying workpieces are moved by the loading device to the station-bound transport means, the production load carriers are moved by the station-bound transport means, at least one of the workpieces, without the production load carrier, is moved by one or more of the manufacturing robots from one of the production load carriers to one or more of the workpiece mounts, one or more of the workpieces is moved, without the production load carriers, by one or more of the manufacturing robots from one of the workpiece mounts to at least another of the workpiece mounts, and one or more of the workpieces is moved, without the production load carriers, from one of the workpiece mounts to one of the production load carriers that has been moved by the station-bound transport means, and production load carriers carrying workpieces, that have been moved by the station-bound transport means, are moved by the loading device from the station-bound transport means to one or more external conveying device transporting production load carriers carrying the workpieces.

2. The manufacturing station in accordance with claim 1, wherein the station-bound transport means is configured as a sequential transport means.

3. The manufacturing station in accordance with claim 1, wherein:
the station-bound transport means is configured to receive a plurality of the production load carriers; and
the station-bound transport means has a plurality of pick-up locations, with each of the locations being for a respective one of the production load carriers.

4. The manufacturing station in accordance with claim 3, wherein a number of the pick-up locations is equal to or greater than a number of the work stations.

5. The manufacturing station in accordance with claim 1, wherein the automated manufacturing station is configured to carry out a work process on the workpiece with a plurality of working steps and with a plurality of work cycles.

6. The manufacturing station in accordance with claim 1, wherein the station-bound transport means is configured as a linear conveyor.

7. The manufacturing station in accordance with claim 1, further comprising a storage unit for one or more of the production load carriers carrying a workpiece.

8. The manufacturing station in accordance with claim 1, further comprising a protective partition, which encloses the manufacturing area and encloses the station-bound transport means.

9. The manufacturing station in accordance with claim 1, wherein the production load carrier is adapted to a plurality of workpieces of different types.

10. The manufacturing station for workpieces according to claim 1, in combination with at least another manufacturing station, wherein the at least another manufacturing station is the same as the automated manufacturing station for workpieces and with the external conveying device for production load carriers, wherein the external conveying device is connected to each of the automated manufacturing station for workpieces and the another manufacturing station.

11. The manufacturing station for workpieces according to claim 1, wherein:
the loading device comprises an upstream loading robot for loading production load carriers carrying the workpieces onto an upstream location of the station-bound transport means from one or more external conveying device and an downstream loading robot for loading production load carriers carrying the workpieces from a downstream location of the station-bound transport means onto one or more external conveying device; and
workpieces are removed from the production load carriers and placed on the production load carriers by the one or more of the manufacturing robots as the station-bound transport means moves production load carriers from the upstream location to the downstream location of the station-bound transport means.

12. An automated manufacturing plant comprising a plurality of manufacturing stations for workpieces, wherein each of the manufacturing stations comprises:
a manufacturing area;
a plurality of program-controlled manufacturing robots, wherein the manufacturing area is configured as a robot garden with the manufacturing robots distributed locally in the manufacturing area;
production load carriers, which receive workpieces to form production load carriers carrying the workpieces, which carry the workpieces as a multipart workpiece comprising parts set in a positioned state, wherein the workpieces are fed to the manufacturing station on the production load carriers from outside the manufacturing station;
a plurality of work stations, wherein a workpiece mount is at each of the work stations, which are distributed locally in the manufacturing area, and the manufacturing robots are associated with the workpiece mounts and configured to work on the workpieces in a region of the associated workpiece mounts;
a station-bound transport means for transporting the production load carriers within the manufacturing station; and
a loading device configured to at least one of load the production load carriers carrying the workpieces, from one or more external conveying device transporting production load carriers carrying the workpieces, onto the station-bound transport means and unload the production load carriers carrying the workpieces from the station-bound transport means to one or more external conveying device transporting production load carriers carrying the workpieces, wherein:
one or more of the manufacturing robots is configured and programmed to load a workpiece, without the production load carriers, from one of the production load carriers carrying the workpieces on the station-bound transport means to one or more of the workpiece mounts of the work stations and to load workpieces, without the production load carriers, from the one or more of the workpiece mounts of the work stations onto one of the production load carriers on the station-bound transport means; and
one or more of the manufacturing robots is configured and programmed to transport a workpiece between the work stations by picking up the workpiece, without the production load carriers, from the workpiece mount at one work station with a gripping tool and depositing the picked up workpiece, without the production load carriers, at the workpiece mount of another work station,
whereby production load carriers carrying workpieces are moved by the loading device to the station-bound transport means, the production load carriers are moved by the station-bound transport means, at least one of the workpieces, without the production load carrier, is moved by one or more of the manufacturing robots from one of the production load carriers to one or more of the workpiece mounts, one or more of the workpieces is moved, without the production load carriers, by one or more of the manufacturing robots from one of the workpiece mounts to at least another of the workpiece mounts, and one or more of the workpieces is moved, without the production load carriers, from one of the workpiece mounts to one of the production load carriers that has been moved by the station-bound transport means and production load carriers carrying workpieces, that have been moved by the station-bound transport means, are moved by the loading device from the station-bound transport means to one or more external conveying device transporting production load carriers carrying the workpieces.

13. The manufacturing plant in accordance with claim 12, further comprising:
an automated conveying device as the external conveying device for production load carriers; and
a logistics area.

14. A manufacturing process for workpieces, the process comprising:
providing an automated manufacturing plant comprising a plurality of manufacturing stations for workpieces, wherein each of the manufacturing stations comprises: a manufacturing area; a plurality of program-controlled manufacturing robots, wherein the manufacturing area is configured as a robot garden with the manufacturing robots distributed locally in the manufacturing area; production load carriers, wherein the workpieces are fed to the manufacturing station on the production load carriers from outside the manufacturing station and the production load carriers receive workpieces to form production load carriers carrying the workpieces, which carry the workpieces as a multipart workpiece comprising parts set in a positioned state; a plurality of work stations, wherein a workpiece mount is at each of the work stations, which are distributed locally in the manufacturing area, and the manufacturing robots are associated with the workpiece mounts; a station-bound transport means for transporting the production load carriers within the manufacturing station; and a loading device configured to at least one of load the production load carriers carrying the workpieces, from one or more external conveying device transporting production load carriers carrying the workpieces, onto the station-bound transport means and unload the production load carriers carrying the workpieces from the station-bound transport means to one or more external conveying device transporting production load carriers carrying the workpieces;
configuring and programming one or more of the manufacturing robots to load a workpiece, without the production load carriers, from one of the production load carriers carrying the workpieces on the station-bound transport means to one or more of the workpiece mounts of the work stations and to load workpieces, without the production load carriers, from the one or more of the workpiece mounts of the work stations onto one of the production load carriers on the station-bound transport means;
configuring and programming one or more of the manufacturing robots to transport a workpiece between the work stations by picking up the workpiece, without the production load carriers, from the workpiece mount at one work station with a gripping tool and depositing the picked up workpiece, without the production load carriers, at the workpiece mount of another work station; and
performing a work process, which comprises a plurality of working steps carried out on the workpiece in the manufacturing station and in the manufacturing area, wherein production load carriers carrying workpieces are moved by the loading device to the station-bound transport means, the production load carriers are moved by the station-bound transport means, at least one of the workpieces, without the production load carrier, is moved by one or more of the manufacturing robots from one of the production load carriers to one or more of the workpiece mounts, one or more of the workpieces is moved, without the production load carriers, by one or more of the manufacturing robots from one of the workpiece mounts to at least another of the workpiece mounts and one or more of the workpieces is moved, without the production load carriers, from one of the workpiece mounts to one of the production load carriers that has been moved by the station-bound transport means and production load carriers carrying workpieces, that have been moved by the station-bound transport means, are moved by the loading device from the station-bound transport means to one or more external conveying device transporting production load carriers carrying the workpieces.

15. The manufacturing process in accordance with claim 14, wherein:
the production load carriers are transported next to and along the plurality of work stations within the manufacturing area;
the production load carriers are moved along in the manufacturing area with a work sequence or production sequence having a plurality of cycles and are available for the work process at at least some of the work stations.

16. The manufacturing process in accordance with claim 15, wherein the multipart workpiece, configured as a parts set of vehicle body parts, is completely or partially removed during the work process having the plurality of cycles from the production load carrier by means of one of the manufacturing robots, is processed and handled at the work stations and transported further between the work stations, wherein any additional parts of the workpiece needed are available on the production load carrier and are fed as needed by a manufacturing robot to the respective work station and to the work process being carried out there.

17. The manufacturing process in accordance with claim 14, wherein one or more empty production load carriers or production load carriers loaded with a workpiece are stored in a storage unit of the manufacturing station.

\* \* \* \* \*